United States Patent
Hsieh et al.

(10) Patent No.: US 7,290,894 B2
(45) Date of Patent: Nov. 6, 2007

(54) INDICATING APPARATUS FOR ELECTRONIC DEVICES

(75) Inventors: Kuan-Hong Hsieh, Guangdong (CN); Te-Hsu Wang, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 160 days.

(21) Appl. No.: 11/307,100

(22) Filed: Jan. 23, 2006

(65) Prior Publication Data

US 2006/0256576 A1 Nov. 16, 2006

(30) Foreign Application Priority Data

May 13, 2005 (CN) .................. 2005 2 0058441

(51) Int. Cl.
*G01D 11/28* (2006.01)
(52) U.S. Cl. .......................... 362/23; 362/85
(58) Field of Classification Search .................. 362/23, 362/24, 29
See application file for complete search history.

(56) References Cited

U.S. PATENT DOCUMENTS

| | | | |
|---|---|---|---|
| 4,262,182 A * | 4/1981 | Basler et al. ............... 200/314 |
| 5,434,757 A * | 7/1995 | Kashiwagi ................... 362/501 |
| 5,477,430 A * | 12/1995 | LaRose ........................ 362/84 |
| 5,718,326 A | 2/1998 | Larose et al. |
| 6,686,847 B1 * | 2/2004 | Mittler ..................... 340/815.4 |
| 6,789,206 B1 | 9/2004 | Wierzbicki et al. |
| 2002/0009910 A1 * | 1/2002 | Posey et al. ................. 439/131 |
| 2002/0063791 A1 * | 5/2002 | Waterman et al. ........... 348/358 |
| 2004/0125585 A1 * | 7/2004 | Sung ........................... 362/26 |
| 2004/0145884 A1 * | 7/2004 | Orikasa ........................ 362/23 |
| 2005/0128483 A1 | 6/2005 | Herkommer et al. |

* cited by examiner

*Primary Examiner*—Ali Alavi
(74) *Attorney, Agent, or Firm*—Winston Hsu

(57) ABSTRACT

An indicating apparatus transmits beams from an indicating lamp and includes a panel. The panel has an open area defined thereon. The open area includes a C-shaped slot and an upright slot. The C-shaped slot generally surrounds an opaque area, and the upright slot is defined in the opaque area. A center of the opaque area is generally aligned with the indicating lamp, and the opaque area has a protrusion pointing toward the indicating lamp. The preferred shape of the protrusion is either a conical or pyramidal, and reflects the beams from the indicating lamp to the open area. One exemplary application of the indicating apparatus is to indicate a "power on" status of an electronic device.

10 Claims, 3 Drawing Sheets

INDICATING APPARATUS FOR ELECTRONIC DEVICES

TECHNICAL FIELD

The present invention relates to electronic visual indicating apparatuses, and particularly to an indicating apparatus which prevent light beams from shining directly into a user's eyes.

RELATED ART

Illuminated symbol buttons are employed in many applications, such as in computer systems. For example, a typical personal computer has power buttons respectively positioned on a front bezel of a display monitor and on a housing of the main computer itself. Each of the power buttons includes a panel and a built-in backlight which preferably is a light emitting diode ("LED"). The panel defines a generally C-shaped slot and an upright slot at a gap in the C-shaped slot. The C-shaped slot and the upright slot together form a power symbol for the power button. Light beams transmitted from the backlight can pass out of the power button via the power symbol. That is, when power is on, the backlight emits light and illuminates the power symbol. This allows a user to be aware of the "power on" status of the computer and/or the display.

If the light beams from the backlight directly shine into the user's eyes, this may cause discomfort. Conventionally, to avoid this problem, a semi-transparent component is provided. The semi-transparent component is usually positioned between the panel and the backlight. The semi-transparent component is required to have a surface area large enough to sufficiently cover the power symbol, thus preventing the backlight from shining directly into user's; eyes. However, the semi-transparent component is an expensive part compared with other parts of the power button, and increases the cost of manufacture of the power button.

Therefore, there is a need for an indicating apparatus which not only prevents light beams of a backlight from directly shining into a user's eyes, but also has a reduced cost.

SUMMARY

An indicating apparatus in accordance with a preferred embodiment is provided. The indicating apparatus transmits beams from an indicating lamp and includes a panel. The panel has an open area defined thereon. The open area includes a C-shaped slot and an upright slot. The C-shaped slot generally surrounds an opaque area, and the upright slot is defined in the opaque area. A center of the opaque area is generally aligned with the indicating lamp, and the opaque area has a protrusion pointing toward the indicating lamp. The preferred shape of the protrusion is either conical or pyramidal, and reflects the beams from the indicating lamp to the open area.

A "power on" status indicating apparatus in accordance with a preferred embodiment is also provided. The indicating apparatus transmits beams from an indicating lamp to indicate a "power on" status of an electronic device and includes a panel. The panel has an open area defined thereon. The open area includes a C-shaped slot and an upright slot. The C-shaped slot generally surrounds an opaque area, and the upright slot is defined in the opaque area. A center of the opaque area is aligned with the indicating lamp, and the opaque area has a protrusion pointing toward the indicating lamp. The preferred shape of the protrusion is either conical or pyramidal, and reflects the beams from the indicating lamp to the open area.

The indicating apparatus and the "power on" status indicating apparatus prevent light of the indicating lamp from shining directly into a user's eyes, and therefore eliminates the risk of discomfort to the user. Unlike in the prior art, the protrusion can be made of plastic, and integrally molded together with the panel, thereby reducing the cost of manufacture.

Other advantages and novel features will be drawn from the following detailed description with reference to the attached drawings, in which:

DETAILED DESCRIPTION OF THE EMBODIMENTS

As an overview, the indicating apparatus provided by the preferred embodiment is used for indicating a "power on" state of an electronic device (of which two typical examples are computers and displays). However, the indicating apparatus may also be used to achieve other purposes.

Figure 1:
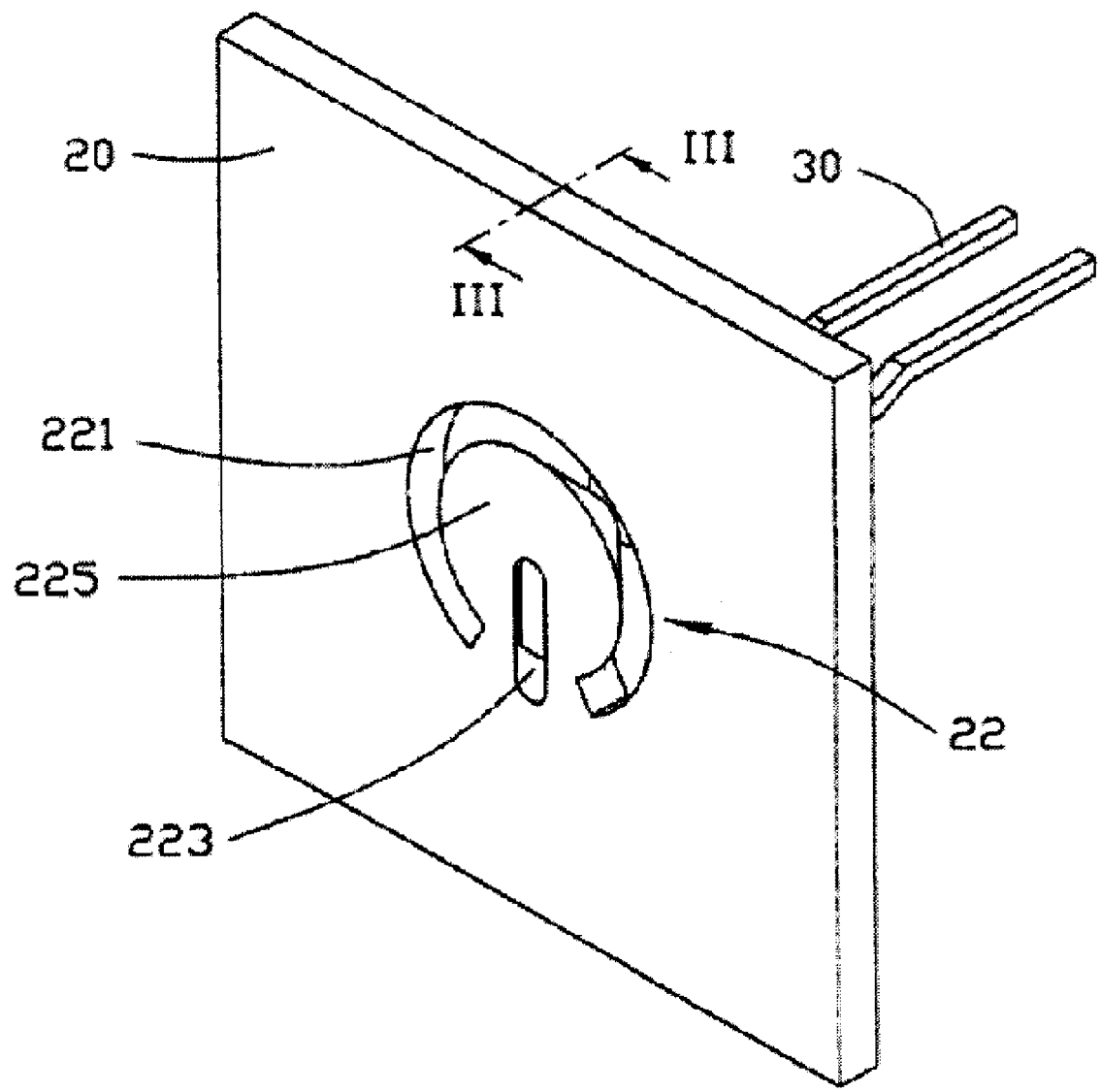
FIG. 1 is a schematic perspective view of an indicating apparatus in accordance with a preferred embodiment of the present invention.
Figure 2:
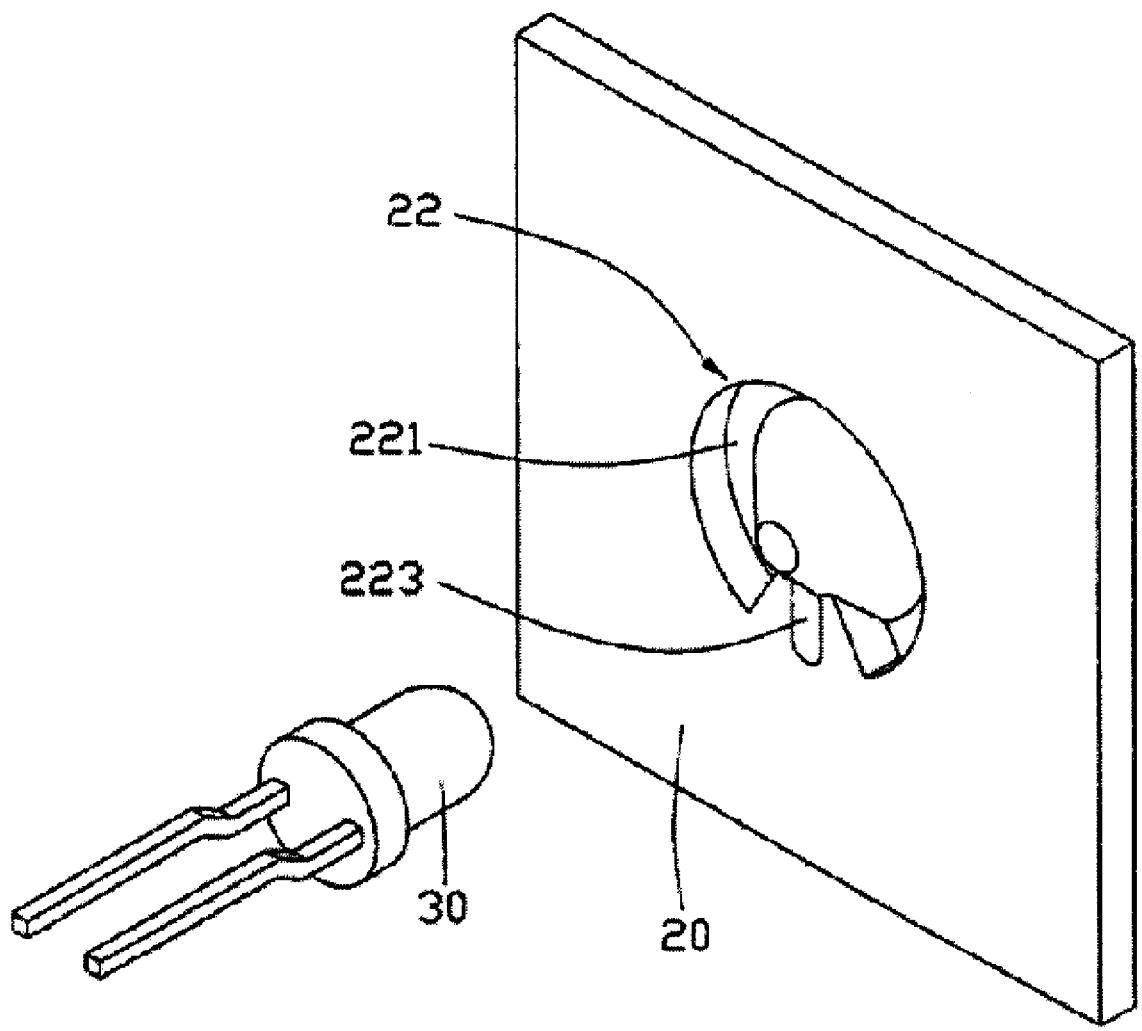
FIG. 2 is an exploded view of the indicating apparatus of FIG. 1, but viewed from another aspect.
Figure 3:
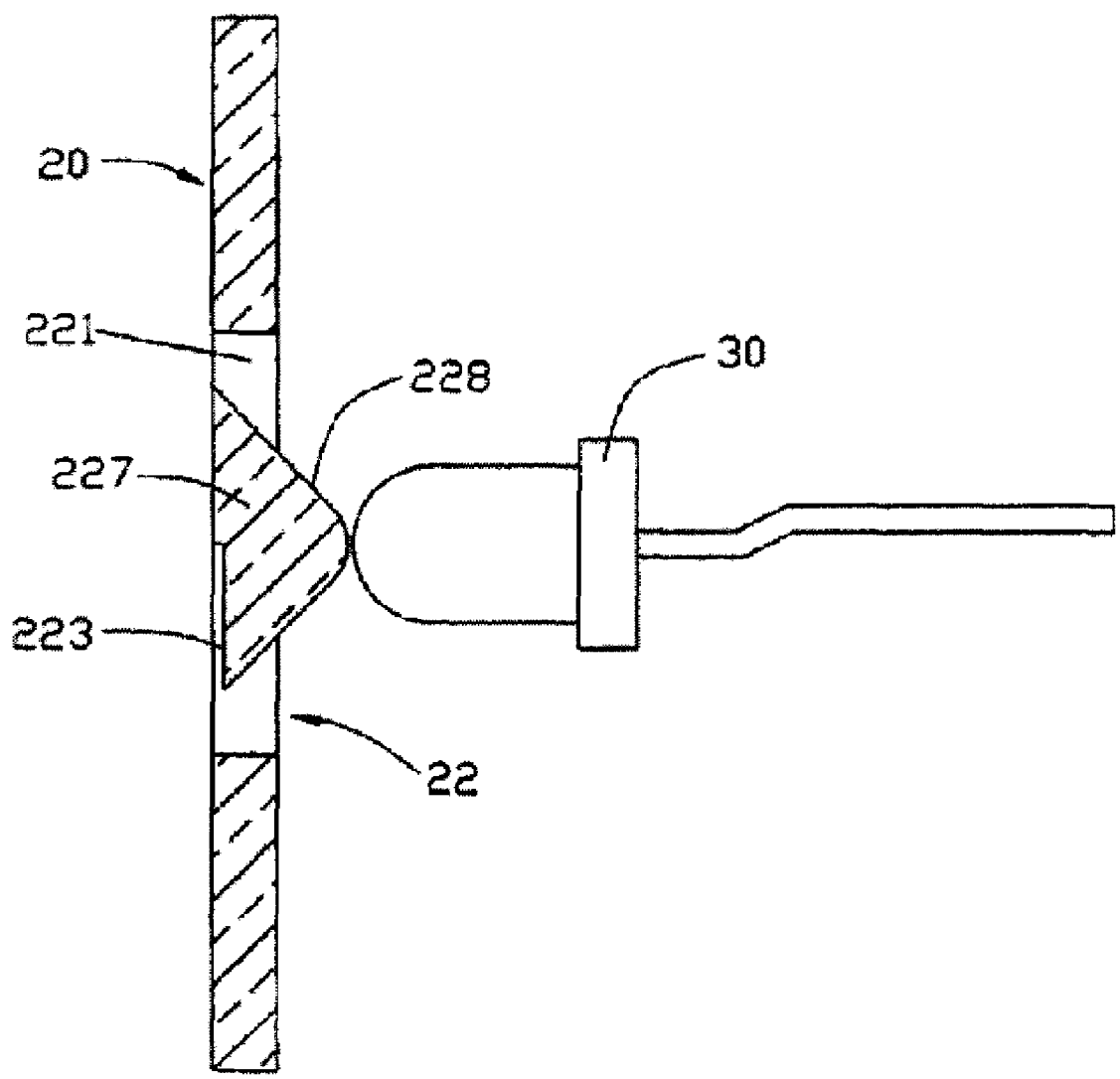
FIG. 3 is a side, cross-sectional view of the indicating apparatus shown in FIG. 1, corresponding to line III-III thereof.

Referring to FIGS. 1 through 3, an indicating apparatus 10 provided by the preferred embodiment includes a panel 20, and an indicating lamp 30 installed behind the panel 20. The panel 20 has an open area 22, which allows the passage of light from the indicating lamp 30. The open area 22 includes a generally C-shaped slot 221 and an upright slot 223, which cooperatively form a power symbol. The C-shaped slot 221 generally surrounds an opaque area 225 of the panel 20. A center of the opaque area 225 is generally aligned with a head portion of the indicating lamp 30. The upright slot 223 is defined in the opaque area 225. A bottom portion of the upright slot 223 spans a complete width of the opaque area 225 from a front surface of the panel 20 to a rear surface of the panel 20. A remaining main portion of the upright slot 223 above the bottom portion is defined in a front surface part only of the opaque area 225.

The opaque area 225 has a tapered protrusion 227 that progressively decreases in size from a front of the panel 20 to a rear of the panel 20 in the preferred embodiment. The protrusion 227 can be either pyramidal or conical. In FIGS. 1 through 3, the protrusion 227 is shown as being conical with a conic surface 228 thereon, for the purpose of exemplifying the preferred embodiment. With such a configuration, light beams from the indicating lamp 30 are reflected by the conic surface 228, and are then transmitted through the C-shaped slot 221 and the upright slot 223. With the indicating apparatus 10 lit in this manner, users can be aware of the "power on" status of the electronic device without the light directly shining into their eyes.

In other embodiments, the opaque area 225 can be formed with a compound-shaped protrusion instead of the tapered protrusion 227. For example, the compound-shaped protrusion can have a surface which is at least partly conical or partly pyramidal in shape. The light beams from the indicating lamp 30 are reflected by the conical or pyramidal surface, and are then transmitted through the C-shaped slot 221 and the upright slot 223. Thereby, discomfort that may otherwise be caused by the light directly shining into a user's eyes is eliminated.

The protrusion 227 (and alternative embodiments thereof such as a compound-shaped protrusion) can be made of plastic and be integrally molded together with the panel 20. This can greatly reduce the cost of manufacture compared to prior art indicating apparatuses.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An indicating apparatus for transmitting light beams from an indicating lamp, the indicating apparatus comprising a panel, the panel having an open area, the open area generally surrounding an opaque area of the panel, the opaque area being for alignment with the indicating lamp, wherein:

the opaque area has a tapered protrusion for pointing toward the indicating lamp, the protrusion having a surface for reflecting the light beams from the indicating lamp to the open area.

2. The indicating apparatus according to claim 1, wherein at least a part of the surface is either conical or pyramidal, or both conical and pyramidal.

3. The indicating apparatus according to claim 1, wherein the protrusion is either conical or pyramidal.

4. The indicating apparatus according to claim 1, wherein the open area comprises a generally C-shaped slot, and the C-shaped slot generally surrounds the opaque area.

5. The indicating apparatus according to claim 4, wherein the open area further comprises an upright slot defined in the opaque area.

6. A "power on" status indicating apparatus for transmitting light beams from an indicating lamp to indicate a "power on" status of an electronic device, the indicating apparatus comprising a panel, the panel having an open area, the open area surrounding an opaque area of the panel, the opaque area being for alignment with the indicating lamp, wherein:

the opaque area has a tapered protrusion pointing toward the indicating lamp, and the protrusion has a surface which reflects the light beams from the indicating lamp to the open area.

7. The indicating apparatus according to claim 6, wherein at least a part of the surface is either conical or pyramidal, or both conical and pyramidal.

8. The indicating apparatus according to claim 6, wherein the protrusion is either conical or pyramidal.

9. The indicating apparatus according to claim 6, wherein the open area comprises a generally C-shaped slot, and the C-shaped slot generally surrounds the opaque area.

10. The indicating apparatus according to claim 9, wherein the open area further comprises an upright slot defined in the opaque area.

* * * * *